United States Patent
Akl et al.

(10) Patent No.: US 11,743,826 B2
(45) Date of Patent: Aug. 29, 2023

(54) POWER MANAGEMENT PRIORITY HANDLING IN INTEGRATED ACCESS AND BACKHAUL

(71) Applicant: QUALCOMM Incorporated, San Diego, CA (US)

(72) Inventors: Naeem Akl, Somerville, NJ (US); Navid Abedini, Somerset, NJ (US); Jianghong Luo, Skillman, NJ (US); Luca Blessent, Whitehouse Station, NJ (US); Karl Georg Hampel, Hoboken, NJ (US); Junyi Li, Chester, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 89 days.

(21) Appl. No.: 17/104,074

(22) Filed: Nov. 25, 2020

(65) Prior Publication Data

US 2021/0204218 A1 Jul. 1, 2021

Related U.S. Application Data

(60) Provisional application No. 62/953,813, filed on Dec. 26, 2019.

(51) Int. Cl.
  *H04W 52/02* (2009.01)
  *H04W 72/044* (2023.01)
  *H04W 72/541* (2023.01)

(52) U.S. Cl.
  CPC ... *H04W 52/0238* (2013.01); *H04W 52/0216* (2013.01); *H04W 72/044* (2013.01); *H04W 72/541* (2023.01)

(58) Field of Classification Search
  None
  See application file for complete search history.

(56) References Cited

U.S. PATENT DOCUMENTS

2009/0129273 A1* 5/2009 Zou ............... H04W 36/06
                                                370/235
2015/0341939 A1  11/2015 Sharma et al.
(Continued)

FOREIGN PATENT DOCUMENTS

CN       110072266 A    7/2019
WO    WO-2021020350 A1 * 2/2021  .......... H04W 52/242

OTHER PUBLICATIONS

Partial International Search Report—PCT/US2020/062464—ISA/EPO—dated Mar. 18, 2021.
(Continued)

*Primary Examiner* — Jamaal Henson
(74) *Attorney, Agent, or Firm* — Patterson & Sheridan, L.L.P/Qualcomm Incorporated

(57) ABSTRACT

Aspects of the present disclosure provide techniques for interference measurements based on a priority value in a network (e.g., an Integrated Access and Backhaul (IAB) network). Certain aspects provide a method for wireless communications. The method generally includes determining, at a first wireless node, a priority value associated with the first wireless node configured to serve one or more child nodes, determining occurrence of interference to communications of the first wireless node and/or a second wireless node, and taking one or more actions in response to the determination of the interference based on the priority value.

27 Claims, 11 Drawing Sheets

(56) References Cited

U.S. PATENT DOCUMENTS

| | | | |
|---|---|---|---|
| 2016/0381596 A1* | 12/2016 | Hu | H04W 28/0268 |
| | | | 370/236 |
| 2018/0302899 A1* | 10/2018 | Aijaz | H04L 1/1621 |
| 2019/0014592 A1* | 1/2019 | Hampel | H04W 72/20 |
| 2019/0110268 A1* | 4/2019 | Abedini | H04L 45/64 |
| 2019/0132096 A1 | 5/2019 | Abedini et al. | |
| 2020/0107362 A1* | 4/2020 | Qi | H04W 72/0453 |
| 2021/0367660 A1* | 11/2021 | Jo | H04B 7/15542 |

OTHER PUBLICATIONS

Qualcomm Incorporated: "Enhancements to Support NR Backhaul Links", 3GPP TSG RAN WG1 Meeting #94b, R1-1811256, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Oct. 12, 2018 (Oct. 12, 2018), 22 Pages, XP051518659, the whole document, figures 1-9, tables 1-6, sections 1-3, section 2.6.
International Search Report and Written Opinion—PCT/US2020/062464—ISA/EPO—dated May 11, 2021.

\* cited by examiner

POWER MANAGEMENT PRIORITY HANDLING IN INTEGRATED ACCESS AND BACKHAUL

CROSS-REFERENCE TO RELATED APPLICATION

This application claims benefit of and priority to U.S. Provisional Application No. 62/953,813, filed on Dec. 26, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for power management in an Integrated Access and Backhaul (IAB) network or other type of network.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications. The method generally includes determining, at a first wireless node, a priority value associated with the first wireless node configured to serve one or more child nodes, determining occurrence of interference to communications of the first wireless node or a second wireless node, and taking one or more actions in response to the determination of the interference based on the priority value.

Certain aspects provide a method for wireless communications. The method generally includes determining, at a first wireless node, a priority value associated with a second wireless node configured to serve one or more child nodes, determining occurrence of interference to communications of the second wireless node or a third wireless node, and taking one or more actions in response to the determination of the interference and based on the priority value.

Certain aspects provide a method for wireless communications. The method generally includes determining, at a first wireless node, a policy for handing interference between a second wireless node and a third wireless node, each of the second wireless node and the third wireless node being configured to serve one or more child nodes, and wherein the policy is based on a priority value associated with at least one of the second wireless node or the third wireless node, and transmitting an indication of the policy to at least one of the second wireless node or the third wireless node.

Certain aspects provide an apparatus for wireless communications. The apparatus generally includes a memory and one or more processors coupled to the memory, the one or more processors being configured to determine, at a first wireless node, a priority value associated with the first wireless node configured to serve one or more child nodes, determine occurrence of interference to communications of the first wireless node or a second wireless node, and take one or more actions in response to the determination of the interference based on the priority value.

Certain aspects provide an apparatus for wireless communications. The apparatus generally includes a memory and one or more processors coupled to the memory, the one or more processors being configured to determine, at a first wireless node, a priority value associated with a second wireless node configured to serve one or more child nodes, determine occurrence of interference to communications of the second wireless node or a third wireless node, and take one or more actions in response to the determination of the interference and based on the priority value.

Certain aspects provide an apparatus for wireless communications. The apparatus generally includes a memory and one or more processors coupled to the memory, the one or more processors being configured to determine, at a first wireless node, a policy for handing interference between a second wireless node and a third wireless node, each of the second wireless node and the third wireless node being configured to serve one or more child nodes, and wherein the policy is based on a priority value associated with at least one of the second wireless node or the third wireless node, and transmit an indication of the policy to at least one of the second wireless node or the third wireless node.

Certain aspects provide an apparatus for wireless communications. The apparatus generally includes means for determining, at a first wireless node, a priority value associated with the first wireless node configured to serve one or more child nodes, means for determining occurrence of interference to communications of the first wireless node or a second wireless node, and means for taking one or more actions in response to the determination of the interference based on the priority value.

Certain aspects provide a method for wireless communications. The method generally includes means for determining, at a first wireless node, a priority value associated with a second wireless node configured to serve one or more child nodes, means for determining occurrence of interference to communications of the second wireless node or a third wireless node, and means for taking one or more actions in response to the determination of the interference and based on the priority value.

Certain aspects provide a method for wireless communications. The method generally includes means for determining, at a first wireless node, a policy for handing interference between a second wireless node and a third wireless node, each of the second wireless node and the third wireless node being configured to serve one or more child nodes, and wherein the policy is based on a priority value associated with at least one of the second wireless node or the third wireless node, and means for transmitting an indication of the policy to at least one of the second wireless node or the third wireless node.

Certain aspects provide a computer-readable medium having instructions stored thereon to cause one or more processors to determine, at a first wireless node, a priority value associated with the first wireless node configured to serve one or more child nodes, determine occurrence of interference to communications of the first wireless node or a second wireless node, and take one or more actions in response to the determination of the interference based on the priority value.

Certain aspects provide a computer-readable medium having instructions stored thereon to cause one or more processors to determine, at a first wireless node, a priority value associated with a second wireless node configured to serve one or more child nodes, determine occurrence of interference to communications of the second wireless node or a third wireless node, and take one or more actions in response to the determination of the interference and based on the priority value.

Certain aspects provide a computer-readable medium having instructions stored thereon to cause one or more processors to determine, at a first wireless node, a policy for handing interference between a second wireless node and a third wireless node, each of the second wireless node and the third wireless node being configured to serve one or more child nodes, and wherein the policy is based on a priority value associated with at least one of the second wireless node or the third wireless node, and transmit an indication of the policy to at least one of the second wireless node or the third wireless node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for power management based on an Integrated Access and Backhaul (IAB) network. For example, power management techniques may be implemented using priority values configured at IAB-nodes. The priority values may be used by the IAB-nodes to determine whether to adjust transmission (TX) configurations in response to detection of interference. For instance, a lower priority IAB-node may reduce transmit power if communications of the IAB-node is causing interference to a higher priority IAB-node, as described in more detail herein.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
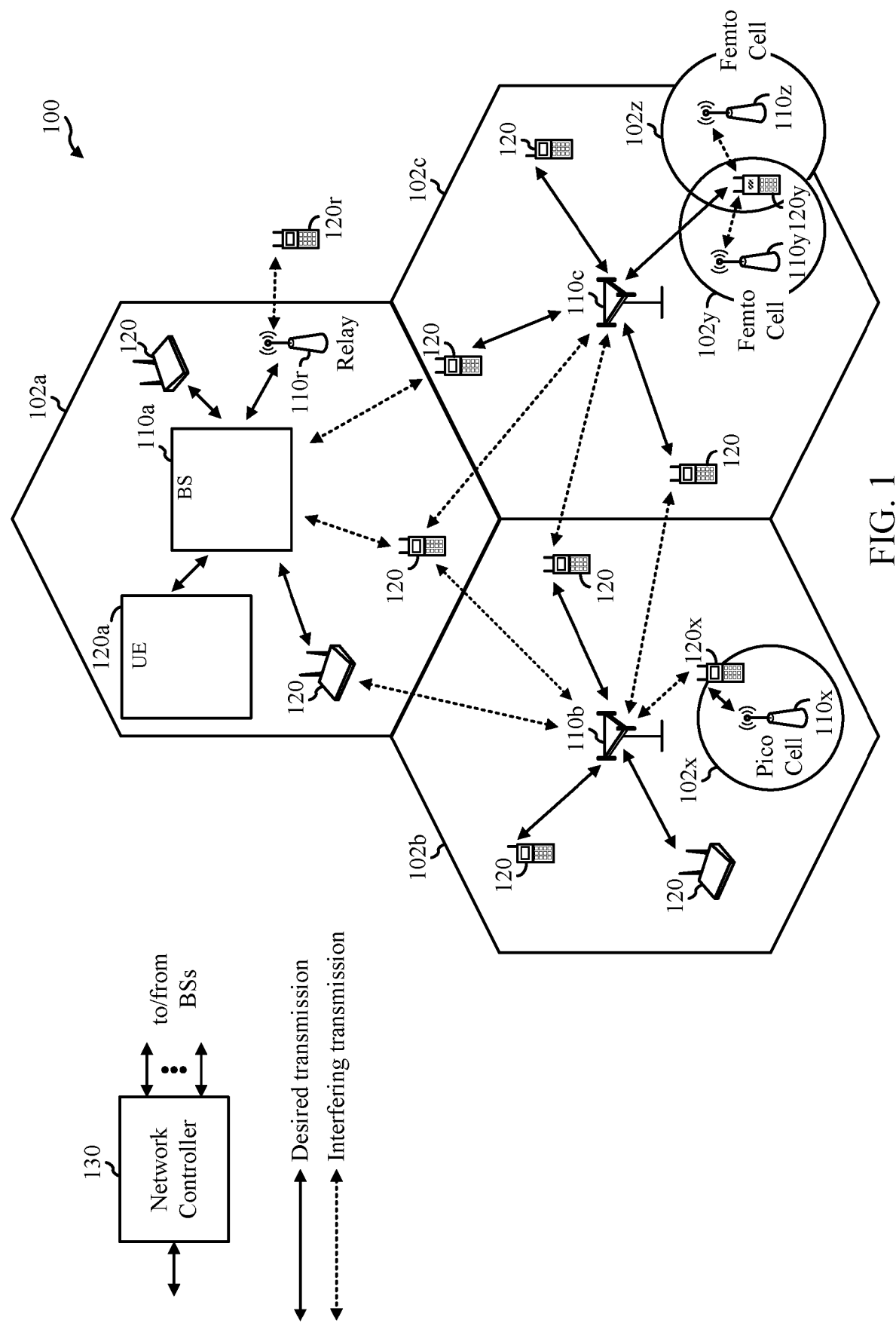
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the network 100 may include an IAB-node (implemented as a UE 120 or BS 110) configured to perform operations 700 of FIG. 7, a network entity (e.g., a BS 110) configured to perform operations 800 of FIG. 8, and/or operations 900 of FIG. 9.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
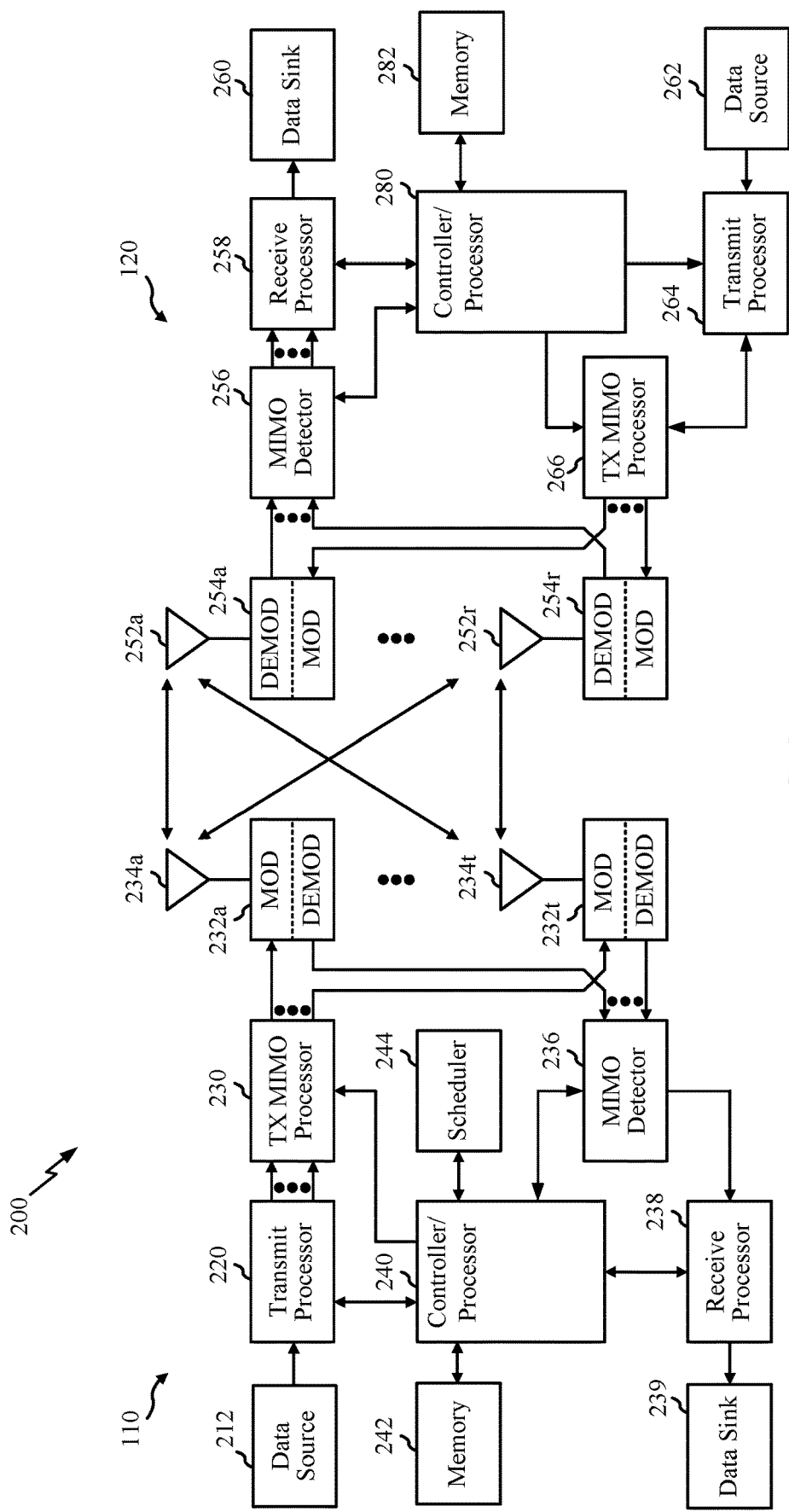
FIG. 2 is a block diagram conceptually illustrating a design of an example a base station (BS) and user equipment (UE), in accordance with certain aspects of the present disclosure.

FIG. 2 illustrates example components 200 of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

It should be noted that though FIG. 2 illustrates UE 120 communicating with a BS 110, a child IAB-node may similarly communicate with a parent IAB-node (or other network entity) and each may (e.g., respectively) have similar components as discussed with respect to FIG. 2. In other words, a child IAB-node may have similar components as UE 120 and may be configured to perform operations 700 of FIG. 7, while a parent IAB-node (or other network entity) may have similar components as BS 110 and may be configured to perform operations 800 of FIG. 8 or operations 900 of FIG. 9.

At the BS 110, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) 254a-254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280. One or more of antennas 252, demodulators 254, MIMO detector 256, receive processor 258, transmit processor 264, TX MIMO processor 266, and/or the like may be components within a transceiver of the UE 120.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240. One or more of antennas 234, demodulators 232, TX MIMO processor 230, transmit processor 220, MIMO detector 236, receive processor 238, and/or the like may be components within a transceiver of the BS 110.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242, 282 may store data and program codes for BS 110 and UE 120, respectively. A scheduler 244 may schedule UEs for data transmission on the downlink and/or uplink.

Figure 3:
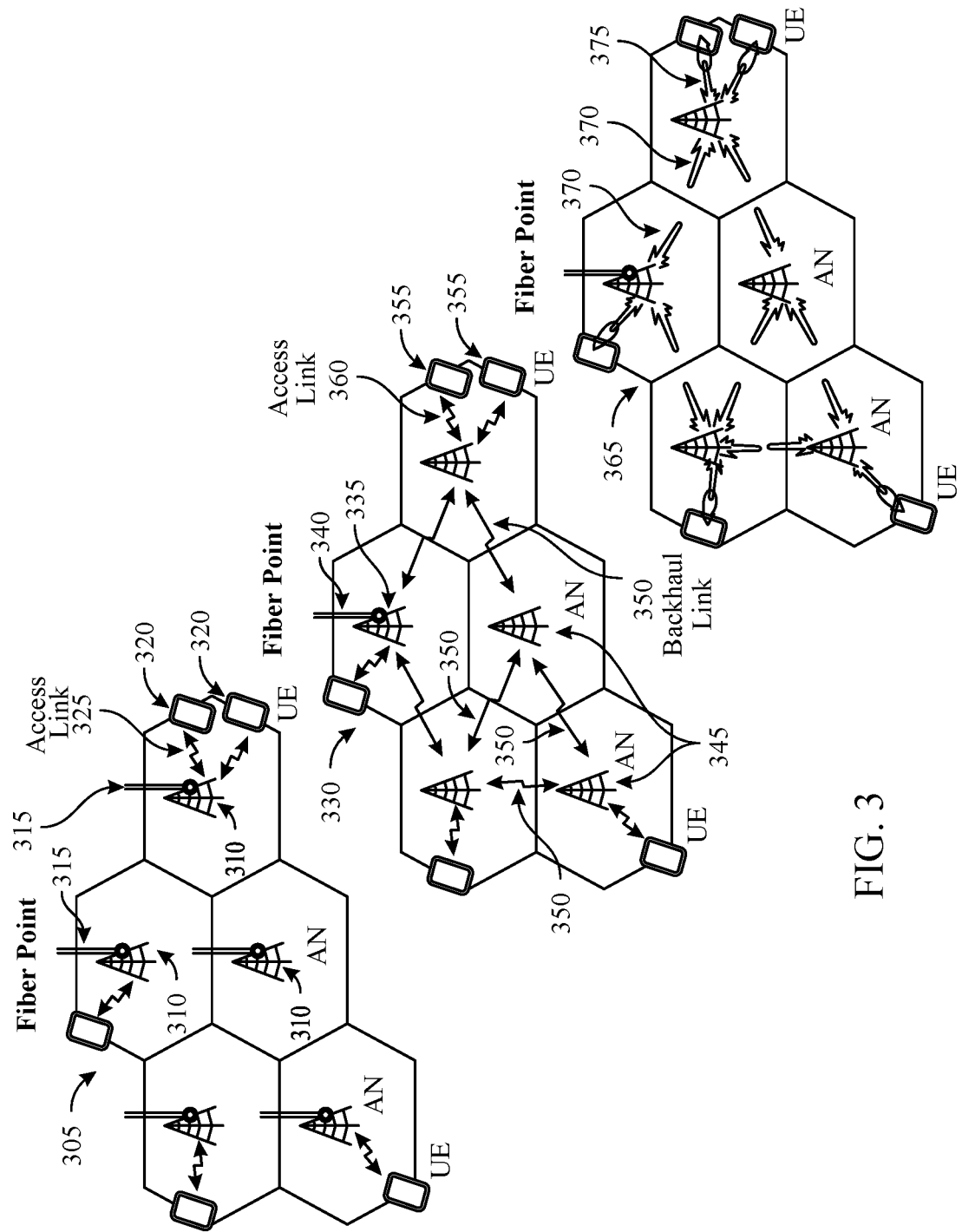
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. An IAB donor is an access node with wireline connection to a core network. An IAB node is an access node that relays traffic from/to Anchor through one or multiple hops. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
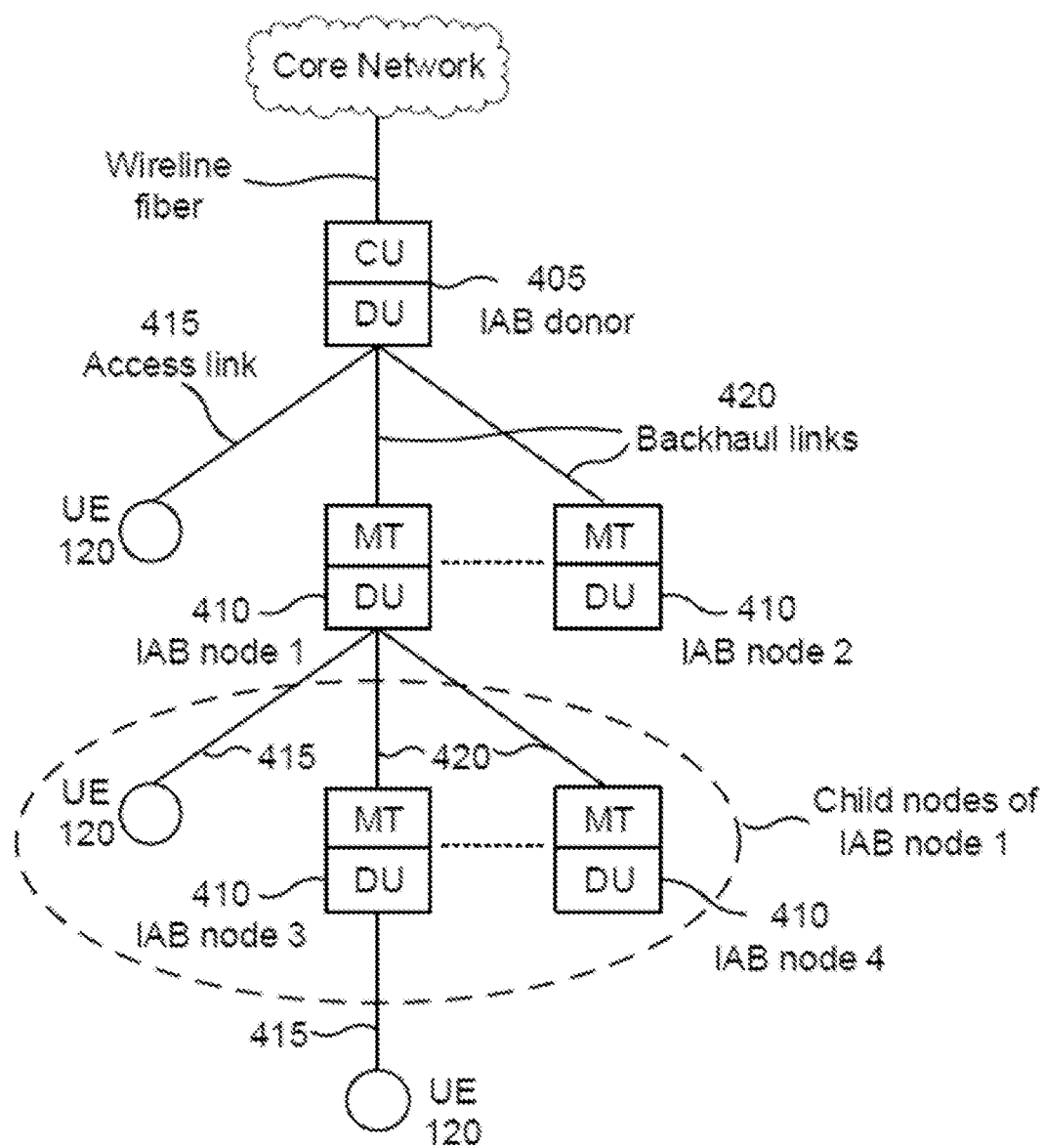
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform access note controller (ANC) functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (FLAP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

As described herein, an IAB donor may be an enhanced gNB node with functions to control IAB-network. A CU may refer to the central entity that controls the entire IAB-network through configuration. The CU holds RRC/PDCP layer functions. A DU may be a scheduling node that schedules child nodes of this IAB-donor. The DU holds RLC/MAC/PHY layer functions. An IAB-node is a L2 relay node consisting of MT and DU functions, as described herein. MT is a scheduled node similar to UE scheduled by its parent IAB-node or IAB-donor. A DU is a scheduling node that schedules child nodes of this IAB-node.

Example Power Management Priority Handling in Integrated Access and Backhaul

Certain aspects of the present disclosure are directed to power management techniques for handling interference for integrated access and backhaul (IAB) networks. For example, a priority value may be configured for various IAB nodes, allowing the IAB nodes to determine whether to adjust transmission (TX) configurations in response to occurrence of interference, as described in more detail herein.

Figure 5A:
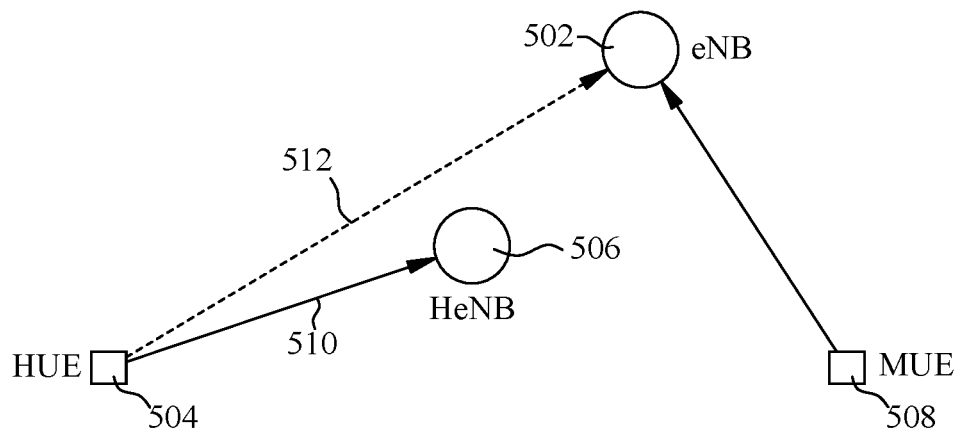
FIGS. 5A and 5B illustrate example wireless systems implemented using a macro eNB (MeNB) and a home eNB (HeNB).
Figure 5B:
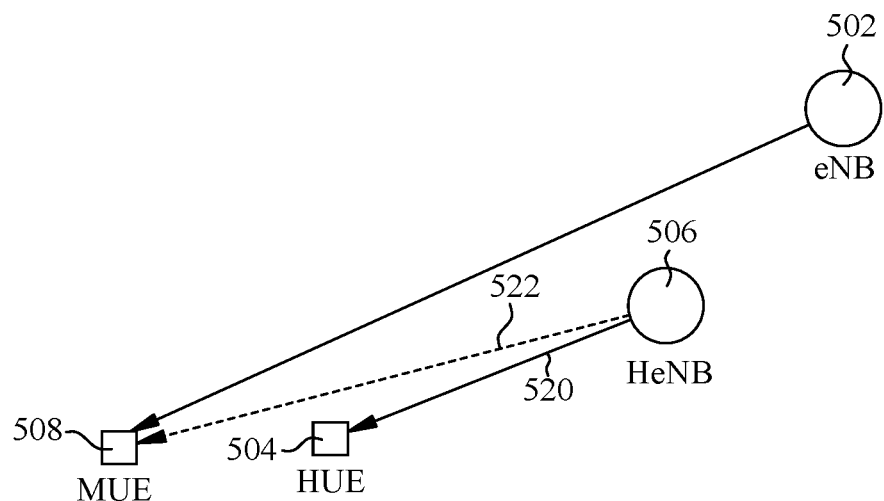

FIGS. 5A and 5B illustrate example wireless systems implemented using a macro eNB (MeNB) 502 and a home eNB (HeNB) 506. As illustrated in FIG. 5A, the HeNB 506 may serve a UE referred to as a home UE (HUE) 504 and the MeNB 502 may serve a UE referred to as a macro UE (MUE) 508. As illustrated, the uplink transmission 510 from the HUE 504 may cause interference 512 to the MeNB. Therefore, HeNB 506 may estimate the pathloss (PL) from the HUE 504 to the victim eNB (e.g., the eNB to which interference is being caused, which is the MeNB 502 in this example). The PL may be determined based on signal measurements performed by the HUE 504 of prior eNB transmissions. For example, prior signal strength measurements based on transmissions from the MeNB 502 may be indicated to the HeNB 506, allowing the HeNB to estimate the interference that may be caused to the MeNB 502 by UL transmissions from the HUE 504. The HeNB may then transmit UL transmission power control (TPC) command to the HUE 504 to reduce the interference at the victim eNB (or other HeNB). A TPC controls uplink TX power for UE and IAB-node MT and may be sent by IAB-donor DU or IAB-node DU to adjust UL transmission power of child node for a desired received power and to minimize interference. TPC may be carried in downlink control information (DCI).

As illustrated in FIG. 5B, the downlink transmission 520 from the HeNB 506 may cause interference 522 to the MUE 508. In this case, the HeNB may estimate the PL to MUE 508 directly or indirectly based on the estimation of PL to the MeNB 502. The HeNB 506 then adjusts DL transmit power to reduce the interference at the victim MUE 508 (or other HUE). For example, the HeNB 506 may assume that the MUE 508 is close to the MeNB 502 and the HUE 504 is close to the HeNB 506. Thus, the HeNB 506 may estimate the interference caused to the MUE 508 based on measurements of transmissions from the MeNB 502 performed by the HUE 504 and reported to the HeNB 506.

Figure 6A:
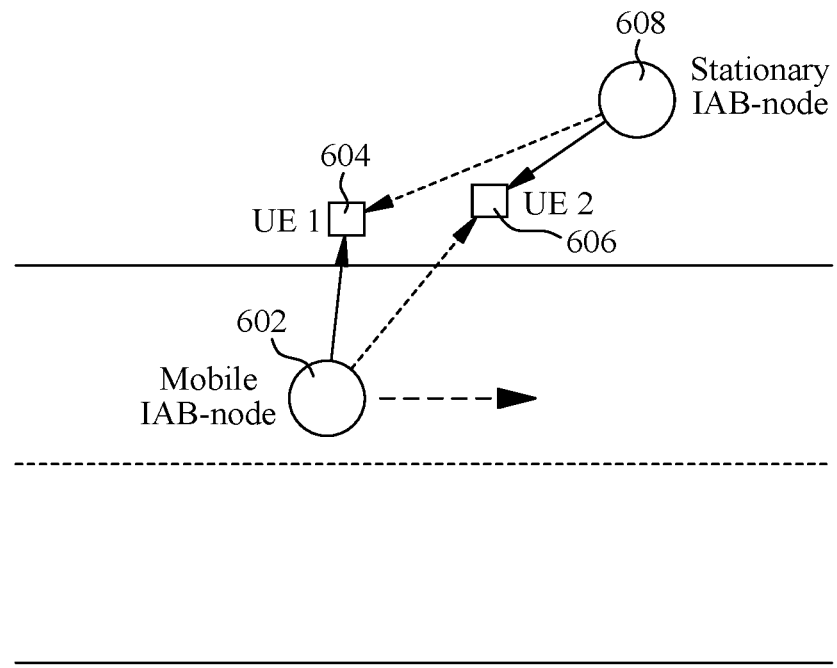
FIGS. 6A, 6B, 6C illustrate various communication systems showing difference interference scenarios.
Figure 6B:
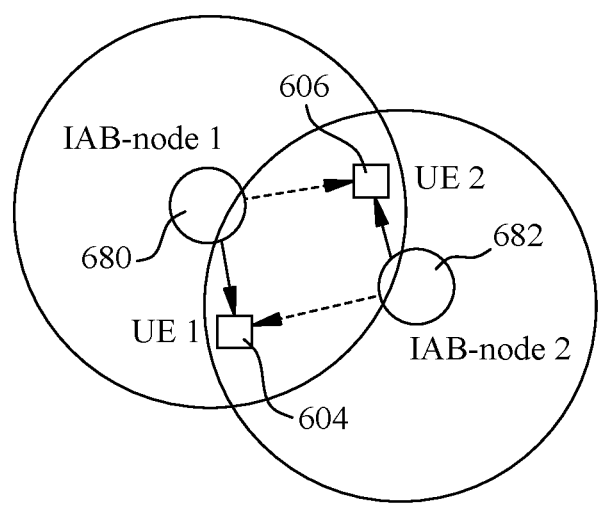
Figure 6C:
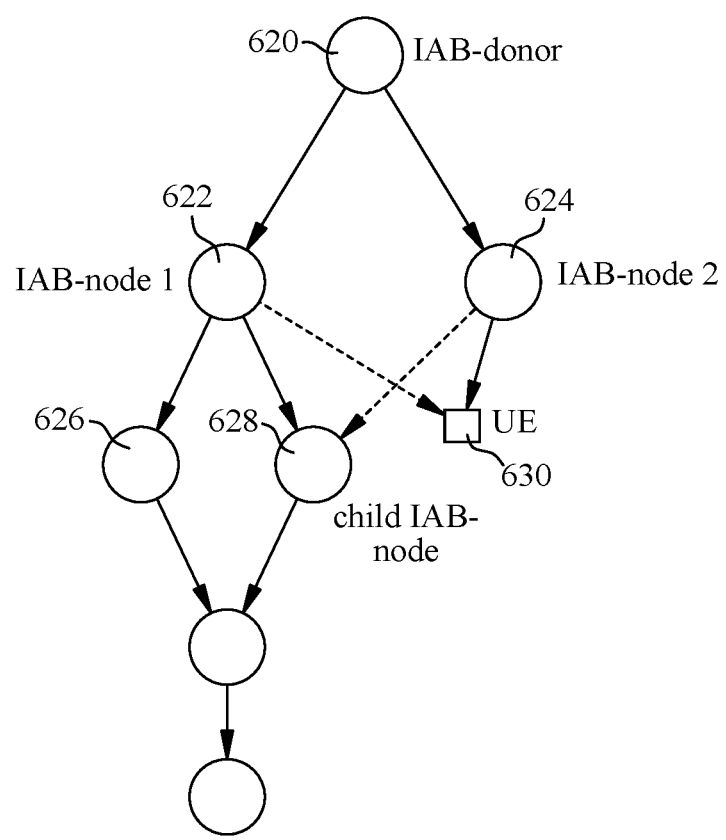

FIGS. 6A, 6B, 6C illustrate various communication systems showing difference interference scenarios in IAB networks. In certain aspects, IAB nodes (e.g., the MT of the IAB node) may perform signal measurements and may not have to rely on measurements done by a UE. An IAB node has L2 functionality, therefore, any L3 measurements performed by a UE may be reported to a CU due to the split of CU and DU as described herein.

As illustrated in FIG. 6A, a mobile IAB-node 602 (e.g., an IAB-node on a vehicle) may be serving a UE 604. The mobile IAB-node 602 may transmit to a UE 604, yet cause interference to a UE 606 that is served by a stationary IAB-node 608. Similarly, the transmission by the IAB-node 608 to the UE 606 may cause interference to the UE 604 being served by the mobile IAB-node 602. In this case, the mobile IAB-node 602, causing interference to the stationary IAB-node 608, may reduce the downlink (DL) transmit power to the UE 604 to reduce the interference.

In an over deployed network, or zero-network planning scenario, as illustrated in FIG. 6B, multiple IAB nodes may have overlapping coverage, causing interference to each other. As illustrated in FIG. 6B, UE 604 and UE 606 are both in an overlapping coverage area with overlapping coverage from both IAB-node 680 and IAB-node 682. Therefore, tiebreaking rules may be used to determine which IAB node may reduce its DL transmit power, as described in more detail herein.

A multi-hop IAB implementation is illustrated in FIG. 6C. As illustrated, the IAB-donor 620 may serve IAB-nodes 622, 624, the IAB-node 624 may serve the UE 630, and the IAB-node 622 may serve the child IAB-nodes 626, 628. The transmission to the UE 630 from the IAB-node 624 may be causing interference to the child IAB-node 628. Moreover, the transmission to the child IAB-node 628 by the IAB-node 622 may cause interference to the UE 630.

Certain aspects of the present disclosure provide techniques for determine which IAB-node is to yield (e.g., reduce its transmit power) in order to reduce the interference. For example, in such a scenario, the IAB-node 624 may yield to IAB-node 622 and reduce the DL transmit power to the UE 630. In other words, the backhaul (BH) link to the child IAB-nodes 626, 628 may be favored over the access link between the IAB-node 624 and the UE 630. Moreover, the IAB-node 622 has a higher load, and thus, may be prioritized for power management.

Certain aspects of the present disclosure are directed to an implementation of a power-management (PM) priority value that may be used for determining which of interfering IAB-nodes' DUs and/or child IAB-nodes' MTs (as well as child UEs) are to modify their respective DL TX configuration and UL TX configuration to reduce interference affecting the function of other nodes. As used herein, an IAB-node may also refer to an IAB-donor DU.

Figure 7:
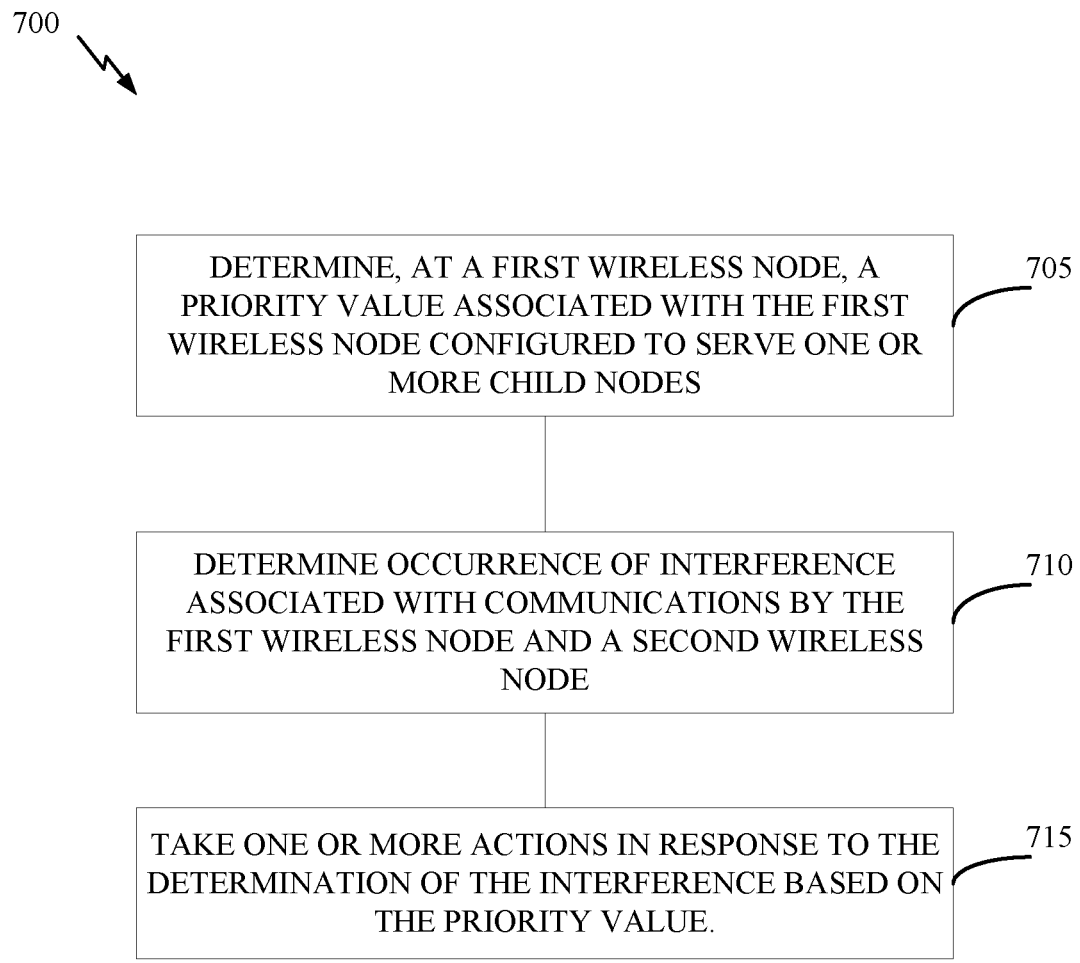
FIG. 7 illustrates a flow diagram illustrating example operations for wireless communication, in accordance with various aspects of the disclosure.

FIG. 7 is a flow diagram illustrating example operations 700 for wireless communication, in accordance with certain aspects of the present disclosure. The operations 700 may be performed by a first wireless node, such as an IAB-node (e.g., IAB-node 622).

Operations 700 may be implemented as software components that are executed and run on one or more processors (e.g., controller/processor 240 of FIG. 2). Further, the transmission and reception of signals by the first wireless communication device in operations 700 may be enabled, for example, by one or more antennas (e.g., antennas 234 of FIG. 2). In certain aspects, the transmission and/or reception of signals by the first wireless communication device may be implemented via a bus interface of one or more processors (e.g., controller/processor 230, 220, 238, 240, and 244) obtaining and/or outputting signals.

Operations 700 may begin, at block 705, by determining, at a first wireless node (e.g., an IAB-node 622), a priority value associated with the first wireless node to configured to serve one or more child nodes (e.g., child IAB-nodes 626, 628). In certain aspects, determining the priority value may include receiving an indication of the priority value. In certain aspects, the priority value may be specific to a beam to be used for communications or a band associated with the communications.

At block 710, the first wireless node may determine occurrence of interference to communications of the first wireless node or a second wireless node (e.g., another IAB-node, such as IAB-node 624) (or both the first wireless not and the second wireless node). In certain aspects, determining the occurrence of the interference may include receiving an indication of the interference.

At block 715, the first wireless node may take one or more actions in response to the determination of the interference and based on the priority value. For example, the first wireless node may determine a priority value associated with the second wireless node, the one or more actions being further based on the priority value associated with the second wireless node.

Certain aspects of the present disclosure are directed to techniques for handing interference when the first wireless node is a victim of interference. For example, determining the occurrence of the interference may include determining that the communications of the second wireless node are causing interference with the communications of the first wireless node. In this case, the first wireless node may perform at least one of transmitting an indication of the interference or adjusting a transmission configuration associated with the communications of the first wireless node. For example, the one or more actions taken at block 715 may include facilitating interference management by transmitting the indication of the interference or adjusting the transmission configuration.

Certain aspects provide techniques for handing interference when the first and second wireless nodes have equal priorities or the priorities of both wireless nodes are unknown. In other words, if the priority value associated with the first wireless node is equal to a priority value associated with the second wireless node or the priority value associated with the second wireless node is unknown by the first wireless node, the one or more actions may include adjusting a transmission configuration associated with the communications of the first wireless node, or transmitting an indication of the occurrence of the interference. In some aspects, adjusting the transmission configuration associated with the communication of the first wireless node may include adjusting the transmission configuration of the first wireless node itself, or one or more child nodes (e.g., child IAB-nodes 626, 628) served by the first wireless node.

Certain aspects provide techniques for handing interference when the first wireless node is the aggressor. In other words, determining the occurrence of the interference may include determining that the communications of the first wireless node are causing interference to the second wireless node. In this case, the one or more actions may include adjusting a transmission configuration associated with the communications of the first wireless node in response to the determination if the priority value associated with the first wireless node is less than a priority value associated with the second wireless node.

Certain aspects of the present disclosure are directed to time break policies for handing scenarios where the first and second wireless nodes have equal priorities or the priorities of both wireless nodes are unknown. For example, if the priority value associated with the first wireless node is equal to the priority value associated with the second wireless node or the priority value associated with the second wireless node is unknown by the first wireless node, the one or more actions further may include determining whether to adjust a transmission configuration associated with the communications of the first wireless node based on a randomization algorithm. As an example, adjusting the transmission configuration may include setting a back-off timer in accordance with the randomization algorithm or transmitting with random probability in accordance with the randomization algorithm. During the back-off timer of a respective wireless node, the wireless node may defer transmissions in an attempt to prevent interference. In some cases, a randomization seed associated with the randomization algorithm may correspond to the priority value associated with the first wireless node. For instance, if IAB-nodes do not know each other's PM priority values, the one with the lower priority may yield a higher probability (e.g., since the random seed is a function of the PM-priority value), or the one with lower priority may wait longer on average.

In some cases, the tie break rules may be deterministic (e.g., instead of being random). For instance, if the priority value associated with the first wireless node is equal to the priority value associated with the second wireless node or the priority value associated with the second wireless node is unknown by the first wireless node, the one or more actions may include determining whether to adjust a transmission configuration associated with the communications of the first wireless node based on identifiers associated with the first wireless node and the second wireless node. For instance, the wireless node with a higher (or lower) identifier may adjust its transmission configuration in such a scenario.

In some cases, a threshold may be configured for detecting excessive interference. For example, determining the occurrence of the interference may be based on whether a parameter corresponding to the interference exceeds a threshold. The threshold may be dependent on the priority value.

Certain aspects of the present disclosure provide techniques for reporting priority values. For example, the first wireless node may report the priority value associated with the first wireless node to the second wireless node or a control node or broadcast the priority value. In some cases, the first wireless node may receive a reporting configuration, the priority value being reported in accordance with the reporting configuration. For instance, the reporting configuration may indicate one or more events that trigger the reporting or a schedule for the reporting.

In some cases, the priority value may be reported using an explicit indication of the priority value or implied by resources used for transmission of a message for reporting the priority value. For instance, using first resources for transmission of the message may indicate a high priority and using second resources for transmission of the message may indicate a low priority. In certain aspects, the first wireless node may transmit a message requesting a priority value associated with the second wireless node, and receive an indication of the priority value associated with the second wireless node. In this case, the one or more actions in response to the determination of the interference is further based on the priority value of the second wireless node.

In some cases, the first wireless node may receive an indication of a priority value associated with the second wireless node, and report the priority value of the second wireless node to a control node. For example, the first wireless node may receive a reporting configuration, the priority value being reported in accordance with the reporting configuration.

Figure 8:
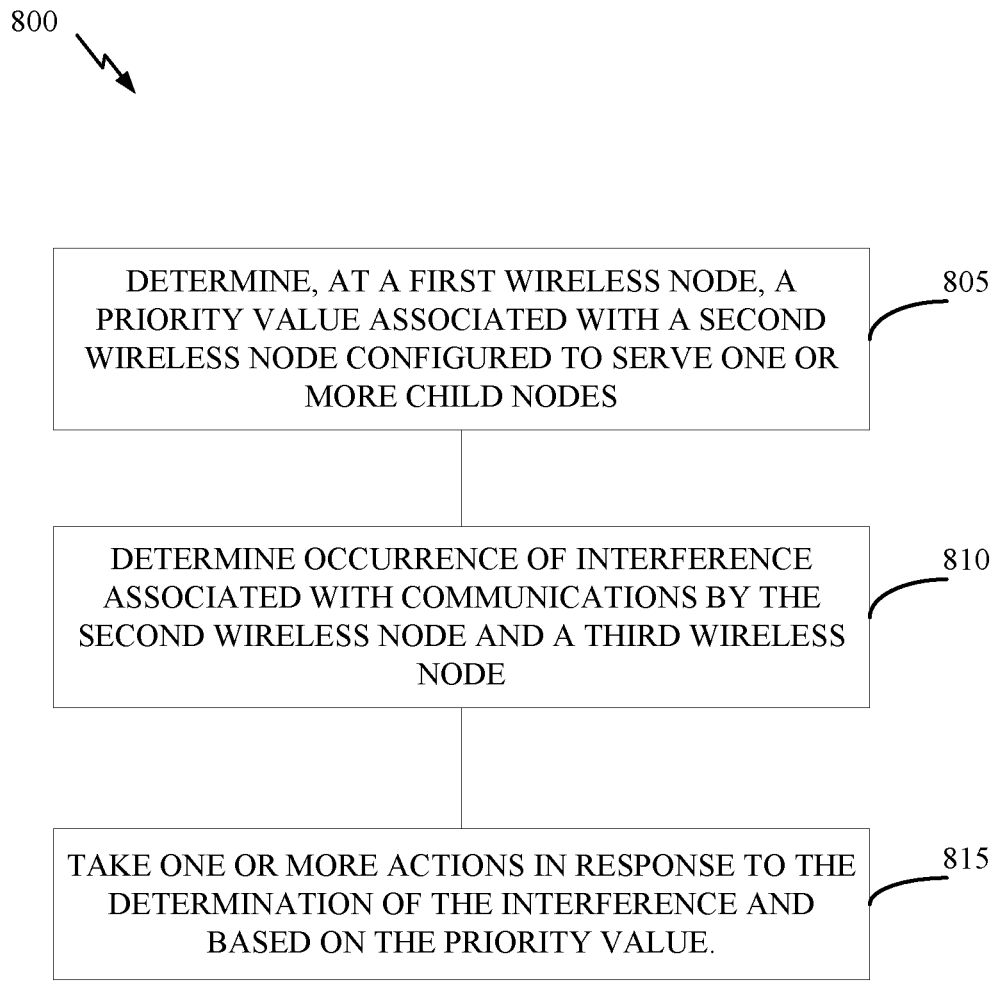
FIG. 8 illustrates a flow diagram illustrating example operations for wireless communication, in accordance with various aspects of the disclosure.

FIG. 8 is a flow diagram illustrating example operations 800 for wireless communication, in accordance with certain aspects of the present disclosure. The operations 800 may be performed by a first wireless node such as a control node.

Operations 800 may be implemented as software components that are executed and run on one or more processors (e.g., controller/processor 280 of FIG. 2). Further, the transmission and reception of signals by the first wireless communication device in operations 800 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 800 begin, at block 805, by determining, at a first wireless node (e.g., control node), a priority value associated with a second wireless node (e.g., an IAB-node, such as IAB-node 622) configured to serve one or more child nodes (e.g., child IAB-nodes 626, 628). At block 810, the control node may determine occurrence of interference to communications of the second wireless node or a third wireless node (e.g., another IAB-node, such as IAB-node 624) (or both the second wireless node and the third wireless node). At block 815, the control node takes one or more actions in response to the determination of the interference and based on the priority value.

In certain aspects, the control node may determine a priority value associated with the third wireless node, the one or more actions being further based on the priority value associated with the third wireless node. In some cases, the determination of the occurrence of the interference may include receiving an indication of the occurrence of the interference. For instance, the control node may receive an indication that the interference has occurred from one of the second wireless node or the third wireless node. In some cases, the control node may transmit, to at least one of the second wireless node or the third wireless node, an indication of a threshold for triggering the occurrence of the interference.

In certain aspects, the control node may transmit at least one of an indication of the priority value associated with the second wireless node or an indication of a priority value associated with the third wireless node to at least one of the second wireless node or the third wireless node. In certain aspects, the indication of the priority value may include a configuration message based on which the at least one of the second wireless node or the third wireless node computes the priority value.

In certain aspects, the second wireless node may be the aggressor. For example, determining the occurrence of the interference may include determining that the communications of the second wireless node are causing interference to a third wireless node (e.g., another IAB-node).

In some cases, the second wireless node may be the aggressor with lower priority than the third wireless node. In other words, the one or more actions may include the control node transmitting an indication, to the second wireless node, to adjust a transmission configuration associated with the communications of the second wireless node if the priority value associated with the second wireless node is less than a priority value associated with the third wireless node. In certain aspects, the indication of adjust the transmission configuration may include indicating a new transmission configuration to be applied.

Certain aspects provide techniques for reporting priority values. For example, the control node may receive a report of the priority value from the second wireless node. In some cases, the control node may transmit a reporting configuration, the reception of the report of the priority value being in accordance with the reporting configuration. The reporting configuration may indicate one or more events that trigger the reporting of the priority value or a schedule for the reporting of the priority value. In certain aspects, the priority value may be reported using an explicit indication of the priority value or implied by resources used for reception of a message reporting the priority value, as described herein.

In certain aspects, the control node may receive a request for priority values to be reported. For example, the control node may determining a priority value associated with the third wireless node, receive, from the second wireless node, a message requesting a priority value of the third wireless node, and transmit, to the second wireless node, an indication of the priority value associated with the third wireless node.

In certain aspects, the control node may receive, from the second wireless node, an indication of a priority value of the third wireless node. In some cases, the control node may transmit a reporting configuration, the reception of the indication of the priority value of the third wireless node being in accordance with the reporting configuration.

In certain implementations, the control node may set policies for interference management for various scenarios. These scenarios may include situations where the second and third wireless nodes are unaware of each other's priority values to be used for interference management, or where the priority values are equal.

Figure 9:
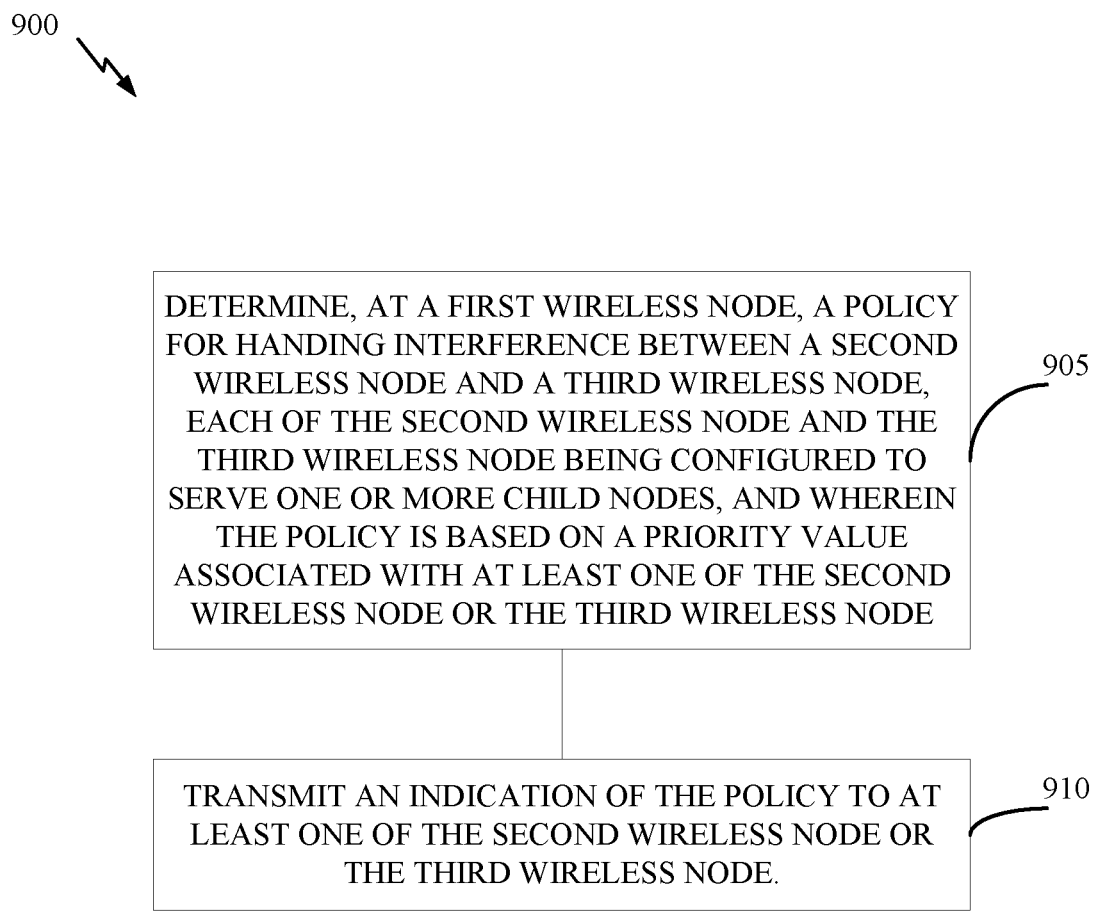
FIG. 9 illustrates a flow diagram illustrating example operations for wireless communication, in accordance with various aspects of the disclosure.

FIG. 9 is a flow diagram illustrating example operations 900 for wireless communication, in accordance with certain aspects of the present disclosure. The operations 900 may be performed by a first wireless node such as a control node.

Operations 900 may be implemented as software components that are executed and run on one or more processors (e.g., controller/processor 280 of FIG. 2). Further, the transmission and reception of signals by the first wireless communication device in operations 900 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 900 begin, at block 905, by determining, at a first wireless node (e.g., control node), a policy for handing interference between a second wireless node (e.g., IAB-node 622) and a third wireless node (e.g., IAB-node 624), each of the second wireless node and the third wireless node being configured to serve one or more child nodes (e.g., child IAB-nodes 626, 628 or UE 630). The policy may be based on a priority value associated with at least one of the second wireless node or the third wireless node.

At block 910, the control node may transmit an indication of the policy to at least one of the second wireless node or the third wireless node. For example, the policy may indicate, to the second wireless node, how to handle the interference if the priority values associated with the second wireless node and the third wireless node are equal or if the priority value associated with the third wireless node is unknown by the second wireless node. Indicating how to handle the interference may include indicating to determine whether to adjust a transmission configuration associated with communications by the second wireless node based on an identifier associated with the second wireless node and the third wireless node.

As another example, indicating how to handle the interference may include indicating to determine whether to adjust a transmission configuration associated with communications of the second wireless node based on a randomization algorithm. In some cases, the policy may indicate, to the second wireless node, a threshold for determining an occurrence of the interference between the second wireless node and the third wireless node. For example, the policy may indicate that the threshold is to be dependent on the priority value associated with the second wireless node.

In certain aspects, the priority value (e.g., also referred to a power management (PM) priority value) may be either assigned to an IAB-node by a control node, another IAB-node, or computed by the IAB-node itself. Computing the PM priority value may be preconfigured (e.g., follow specification rules) or follow a control node's configuration (e.g., configured by the CU of IAB-donor). The computed priority value may be reported to the control node or another node (e.g., parent node). The PM priority value may be one of a discrete range of values.

The PM priority value may reflect various configurations of the IAB-node such as mobility state, hop count, node relationship (e.g. parent IAB-node vs. child IAB-node), node type (e.g. IAB-node vs. IAB-donor, IAB-node vs. eNB (e.g., since eNB may access NR network)), network load, load type (e.g., access vs. BH), quality of service (QoS) requirement of child service, control vs. data, or mode of operation (e.g., whether configured as fully active or in power-save (PS) mode with limited service). For example, it may be important to avoid interfering with an IAB node when the IAB-node wakes up from PS mode. In certain implementations, the PM priority value may be beam-specific or frequency-specific. For example, different PM priority values may be computed for each beam or band since different beams and bands may be associated with different interference levels. Thus, an IAB-node may attain multiple PM priority values.

As used herein, a TX configuration may refer to various configurations that aim to reduce interference, such as TX power or power range, periodicity of transmission, number of TX occasions per period (duty cycle), frequency domain resources (e.g. resource blocks (RBs)/bandwidth parts (BWPs) used for communication, beam sweep configuration for measurement reference signal (RS)/broadcast signals and messages (e.g., number of beams and beam shape), beam configuration for control/data communication (e.g., beam width), or any combination thereof. For example, the TX power of a specific signal/channel/resource may be set using the TX configuration since it may be important to have selective power profile for a more flexible power control.

As referred to herein, a node function may refer to the interaction, both TX and RX, with other nodes such as a parent node, child node, or UE. In certain aspects, an actual TX power or a maximum TX power may be determined based at least on one of the aggressor's (e.g., node causing interference) and/or victim's priority level and the estimated PL (or RSSI/RSRP) to the victim cell.

Certain aspects of the present disclosure provide techniques for communicating PM-priority values of various IAB-nodes, allowing the IAB-nodes to perform interference management. In certain aspects, a second IAB-node may indicate a PM priority value via a broadcast message. For example, the PM-priority value may be indicated via a system information block (e.g., SIB1), a reference signal or over an established link towards an IAB-node. An IAB-node may report to a control node an acquired PM priority value of a second IAB-node, in certain implementations. As used herein, a control node may refer to a CU, parent node, or a local control node. In some implementations, the report transmitted to the control node may be transmitted along with a measurement report being sent to the control node. A control node may send to an IAB-node a PM priority value of another IAB-node to facilitate interference management. In certain aspects, a control node may request that an IAB-node to send a PM priority value of the IAB-node itself or the priority value of one or more other nodes to be used for interference management.

An IAB-node may request to be indicated a PM priority value of another IAB-node from a control node or the other IAB-node itself. In some aspects, a UE or IAB-node MT may read a PM priority value in a broadcast message of another IAB-node, and indicate the value to a control node. For example, the UE or IAB-node MT may receive the broadcast message and transmit an RRC measurement report to indicate the priority value to the control node, allowing the control to manage interference accordingly.

In certain aspects of the present disclosure, a threshold may be defined/configured to be used to determine whether one IAB-node is causing excessive interference on another IAB-node, as described herein. In certain aspects, the threshold may be dependent on the PM-priority value (e.g., the PM-priority value of the IAB-node that is the aggressor, or the PM-priority value of the IAB-node that is the victim of interference). For instance, an IAB-node may determine that it is causing excessive interference (e.g., and take corrective action accordingly) if the interference being caused is above a first threshold corresponding to a first PM-priority value, of if the interference is above a second threshold corresponding to a second PM-priority value.

In some cases, an IAB-node may modify its DL TX configuration and/or the UL TX configuration of one or more child MTs/UEs to suppress interference at a victim node upon determining that the IAB-node or a child node is causing interference at the victim node and the victim node has higher priority.

In certain aspects, a victim IAB-node may indicate (e.g., send a complaint about interference) to another IAB-node or the control node indicating that the other IAB-node is causing interference. The victim IAB-node may request that the other IAB-node modify its DL TX configuration and/or the UL TX configuration of one or more child MTs/UEs upon determining that the other IAB-node is causing interference at the victim IAB-node/child node and that the other IAB-node has lower priority.

An IAB-node that determines that the IAB-node (or a child MT/UE) is causing interference to another IAB-node or receives interference from another IAB-node (or second IAB-node's child MT/UE), and is aware that the other IAB-node has equal priority or unknown priority, may modify its DL TX configuration or its child MT/UE's UL TX configuration, or send an indication (e.g., a complaint about interference) to the other IAB-node or control node, as described herein.

Upon receiving a complaint about interference, a control node may coordinate configurations among nodes. For example, the control node may indicate to the lower priority node to modify its DL TX configuration or a child's UL TX configuration, where the lower and/or higher priority node may be complaining to the control node. The control node may also break a tie among two nodes with same priority level (e.g. which may be unknown to both nodes). For example, the control node may indicate to one of the two nodes having the same priority to take action for reducing interference as described herein.

If a control node is not involved in the configuration for interference management, two conflicting IAB-nodes that are unaware of each other's PM priority values or realize that the their priory values are equal, may break the tie randomly. For example, the IAB-nodes may transmit/schedule child MT/UE or modify a TX configuration in accordance with a probability, or back-off transmission/scheduling for a random time. In certain implementations, a random seed for the randomization (e.g., a randomization algorithm) may be a function of the PM priority value of the respective IAB-node, as described herein. In other words, if the IAB-nodes do not know each other's PM priority values, the one with the lower priority may yield a higher probability (e.g., since the random seed is a function of the PM-priority value), or the one with lower priority may wait longer on average.

In some cases, breaking a tie may deterministic, as described herein. For example, if the IAB-nodes are aware of each other's physical cell ID (PCI), the IAB-node with the smaller PCI may yield to the IAB-node with the higher PCI. The tie breaking rules may apply to IAB-nodes with equal PM-priority values or IAB-nodes that do not know each other PM-priority values.

Certain aspects of the present disclosure are directed to techniques for modifying TX configuration or sending an indication of interference. For example, modifying DL TX configuration/a child's UL TX configuration or sending an indication (e.g., interference complaint) may be carried out by an IAB-node following a preconfigured rule (e.g., per specification), or in accordance with a configuration of a control node.

Reporting a PM priority value to a control node, or in a broadcast message, or to another IAB-node via a reference signal or on an established link may be explicitly signaled (e.g., via an information element), or implicitly signals. For example, the PM-priority value may be implied by the resources over which a signal is transmitted (e.g., to a control node).

In certain aspects, an IAB-node may receive a reporting configuration to be used for reporting of a PM priority value such that the PM priority value can be used for interference management, as described herein. For example, the configuration may indicate that a PM priority value is to be reported after a time period has elapsed (e.g., periodically), or upon occurrence of an event. For example, the reporting may be conditioned on interference measurements (e.g., when the IAB-node measures interference above a certain threshold), conditioned on a PM priority value of the IAB-node (e.g., report when the PM priority value changes), conditioned on learning a PM priority value of another IAB-node, or conditioned on receiving a request to indicate the PM priority value of the IAB-node.

A reporting configuration of a PM priority value of an IAB-node, requesting configuration of a PM priority value of another IAB-node and policy configuration in relation to a PM priority value of another IAB-node may be indicated to an IAB-node via an radio resource control (RRC) message, F1-AP message, medium access control (MAC) control element (CE), L1 RS, downlink control information (DCI), uplink control information (UCI) or broadcast message.

Figure 10:
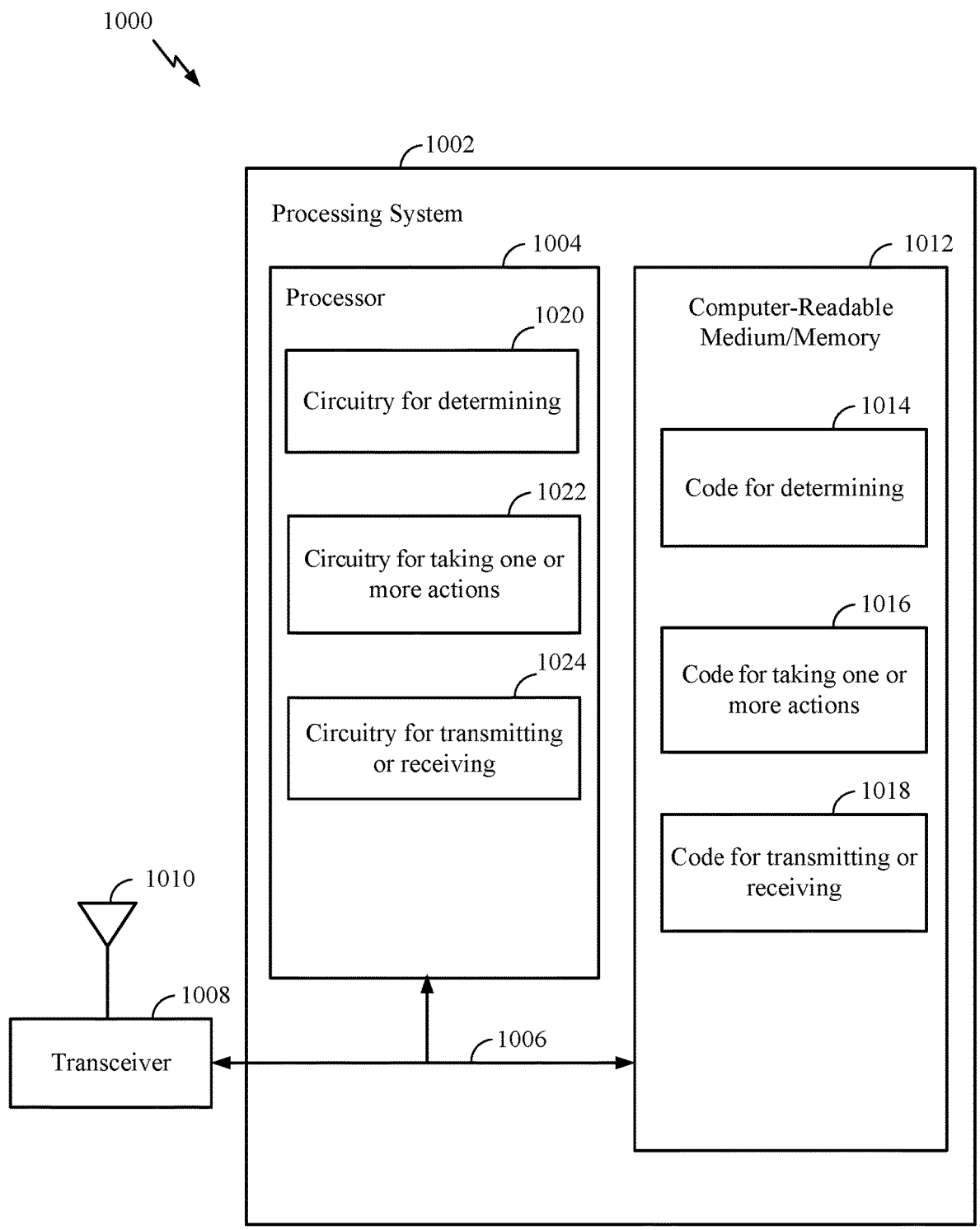
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 7-9. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The transceiver 1008 can, for example, include one or more components of UE 120 with reference to FIG. 2, including, for example, demodulators 254, MIMO detector 256, receive processor 258, transmit processor 264, TX MIMO processor 266, and/or the like. Additionally or alternatively, the transceiver 1008 can, for example, include one or more components of BS 110 with reference to FIG. 2, including, for example, demodulators 232, TX MIMO processor 230, transmit processor 220, MIMO detector 236, receive processor 238, and/or the like. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 7-9, or other operations for performing the various techniques discussed herein for interference management in an IAB network. In certain aspects, computer-readable medium/memory 1012 stores code 1014 for determining (e.g., determining a priority value, determining occurrence of interference, or determining a policy for handling interference); code 1016 for taking one or more actions (e.g., to manage interference); and code 1018 for transmitting or receiving (e.g., transmitting an indication of a policy). In certain aspects, the processor 1004 has circuitry configured to implement the code stored in the computer-readable medium/memory 1012. The processor 1004 includes circuitry 1020 for determining (e.g., determining a priority value, determining occurrence of interference, or determining a policy for handling interference); circuitry 1022 for taking one or more actions (e.g., to manage interference); and circuitry 1024 for transmitting or receiving (e.g., transmitting an indication of a policy).

For example, means for transmitting (or means for outputting for transmission) may include a transmitter and/or an antenna(s) 234 of the BS 110 or transmitter and/or antenna(s) 252 of the UE 120 illustrated in FIG. 2 and/or circuitry 1024 and/or transceiver 1008 of the communication device 1000 in FIG. 10. Means for receiving (or means for obtaining) may include a receiver and/or an antenna(s) 234 of the BS 110 or a receiver and/or antenna(s) 252 of the UE 120 illustrated in FIG. 2 and/or circuitry 1024 and/or transceiver 1008 of the communication device 1000 in FIG. 10. Means for determining and means for taking one or more actions may include a processing system, which may include one or more processors, such as the transmit processor 220, the TX MIMO processor 230, the receive processor 238, and/or the controller/processor 240 of the BS 110 or the receive processor 258, the transmit processor 264, the TX MIMO processor 266, and/or the controller/processor 280 of the UE 120 illustrated in FIG. 2 and/or the processing system 1002 of the communication device 1000 in FIG. 10.

Example Aspects

Aspect 1. A method for wireless communication, comprising: determining, at a first wireless node, a priority value associated with the first wireless node configured to serve one or more child nodes; determining occurrence of interference to communications of the first wireless node or a second wireless node; and taking one or more actions in response to the determination of the interference based on the priority value.

Aspect 2. The method of aspect 1, further comprising determining a priority value associated with the second wireless node, wherein the one or more actions are further based on the priority value associated with the second wireless node.

Aspect 3. The method of one of aspects 1-2, wherein determining the occurrence of the interference comprises receiving an indication of the interference.

Aspect 4. The method of one of aspects 1-3, wherein determining the priority value comprises receiving an indication of the priority value.

Aspect 5. The method of one of aspects 1-4, wherein the priority value is specific to a beam to be used for the communications or a band associated with the communications.

Aspect 6. The method of one of aspects 1-5, wherein determining the occurrence of the interference comprises determining that the communications of the second wireless node are causing interference to the communications of the first wireless node, the method further comprising at least one of transmitting an indication of the interference or adjusting a transmission configuration associated with the communications of the first wireless node.

Aspect 7. The method of one of aspects 1-6, wherein, if the priority value associated with the first wireless node is equal to a priority value associated with the second wireless node or the priority value associated with the second wireless node is unknown by the first wireless node, the one or more actions comprise: adjusting a transmission configuration associated with the communications of the first wireless node; or transmitting an indication of the occurrence of the interference.

Aspect 8. The method of one of aspects 1-7, wherein determining the occurrence of the interference comprises determining that the communications of the first wireless node are causing interference to the communications of the second wireless node.

Aspect 9. The method of aspect 8, wherein the one or more actions comprise adjusting a transmission configuration associated with the communications of the first wireless node if the priority value associated with the first wireless node is less than a priority value associated with the second wireless node.

Aspect 10. The method of one of aspects 6, 7, and 9, wherein the transmission configuration to be adjusted is preconfigured or indicated to the first wireless node.

Aspect 11. The method of one of aspects 6, 7, and 9, wherein adjusting the transmission configuration comprises adjusting: a transmission power or power range associated with the communications of the first wireless node; periodicity of transmissions associated with the communications of the first wireless node; number of transmission occasions per period associated with the communications of the first wireless node; frequency domain resources to be used for the communications of the first wireless node; beam configuration to be used for the communications of the first wireless node; or any combination thereof.

Aspect 12. The method of one of aspects 8-11, wherein, if the priority value associated with the first wireless node is equal to the priority value associated with the second wireless node or the priority value associated with the second wireless node is unknown by the first wireless node, the one or more actions further comprise determining whether to adjust a transmission configuration associated with the communications of the first wireless node based on a randomization algorithm.

Aspect 13. The method of aspect 12, wherein adjusting the transmission configuration comprises setting a back-off timer in accordance with the randomization algorithm or transmitting with random probability in accordance with the randomization algorithm.

Aspect 14. The method of one of aspects 12-13, wherein a randomization seed associated with the randomization algorithm corresponds to the priority value associated with the first wireless node.

Aspect 15. The method of one of aspects 8-14, wherein, if the priority value associated with the first wireless node is equal to the priority value associated with the second wireless node or the priority value associated with the second wireless node is unknown by the first wireless node, the one or more actions further comprise determining whether to adjust a transmission configuration associated with the communications of the first wireless node based on identifiers associated with the first wireless node and the second wireless node.

Aspect 16. The method of one of aspects 1-15, wherein determining the occurrence of the interference is based on whether a parameter corresponding to the interference exceeds a threshold.

Aspect 17. The method of aspect 16 wherein the threshold is dependent on the priority value.

Aspect 18. The method of one of aspects 1-17, further comprising reporting the priority value associated with the first wireless node to the second wireless node or a control node or broadcasting the priority value.

Aspect 19. The method of aspect 18, further comprising receiving a reporting configuration, wherein the priority value is reported in accordance with the reporting configuration.

Aspect 20. The method of aspect 19, wherein the reporting configuration indicates one or more events that trigger the reporting or a schedule for the reporting.

Aspect 21. The method of one of aspects 18-20, wherein the priority value is reported using an explicit indication of the priority value or implied by resources used for transmission of a message for reporting the priority value.

Aspect 22. The method of one of aspects 1-21, further comprising: transmitting a message requesting a priority value associated with the second wireless node; and receiving an indication of the priority value associated with the second wireless node, wherein the one or more actions in response to the determination of the interference is further based on the priority value of the second wireless node.

Aspect 23. The method of one of aspects 1-22, further comprising: receiving an indication of a priority value associated with the second wireless node; and reporting the priority value of the second wireless node to a control node.

Aspect 24. The method of aspect 23, further comprising receiving a reporting configuration, wherein the priority value is reported in accordance with the reporting configuration.

Aspect 25. The method of one of aspects 1-24, wherein the determination of the priority value associated with the first wireless node is based on at least one of: a mobility state of the first wireless node; a hop count associated with the first wireless node; a type of the first wireless node; network load of the first wireless node; a type of the network load; or a mode of operation of the first wireless node.

Aspect 26. A method for wireless communication, comprising: determining, at a first wireless node, a priority value associated with a second wireless node configured to serve one or more child nodes; determining occurrence of interference to communications of the second wireless node or a third wireless node; and taking one or more actions in response to the determination of the interference and based on the priority value.

Aspect 27. The method of aspect 26, further comprising determining a priority value associated with the third wireless node, wherein the one or more actions are further based on the priority value associated with the third wireless node.

Aspect 28. The method of one of aspects 26-27, wherein the determination of the occurrence of the interference comprises receiving an indication of the occurrence of the interference.

Aspect 29. The method of aspect 28, further comprising transmitting, to at least one of the second wireless node or the third wireless node, an indication of a threshold for triggering the occurrence of the interference.

Aspect 30. The method of one of aspects 26-29, further comprising transmitting at least one of an indication of the priority value associated with the second wireless node or an indication of a priority value associated with the third wireless node to at least one of the second wireless node or the third wireless node.

Aspect 31. The method of aspect 30, wherein the indication of the priority value comprises a configuration message based on which the at least one of the second wireless node or the third wireless node computes the priority value.

Aspect 32. The method of one of aspects 26-31, wherein the priority value is specific to a beam to be used for the communications of the first wireless node or a band associated with the communications of the first wireless node.

Aspect 33. The method of one of aspects 26-32, wherein determining the occurrence of the interference comprises determining that the communications of the second wireless node are causing interference to a third wireless node.

Aspect 34. The method of aspect 33, wherein the one or more actions comprise transmitting an indication, to the second wireless node, to adjust a transmission configuration associated with the communications of the second wireless node if the priority value associated with the second wireless node is less than a priority value associated with the third wireless node.

Aspect 35. The method of aspect 34, wherein the indication of adjust the transmission configuration comprises indicating a new transmission configuration to be applied.

Aspect 36. The method of one of aspects 26-35, further comprising receiving a report of the priority value from the second wireless node.

Aspect 37. The method of aspect 36, further comprising transmitting a reporting configuration, wherein the reception of the report of the priority value is in accordance with the reporting configuration.

Aspect 38. The method of aspect 37, wherein the reporting configuration indicates one or more events that trigger the reporting of the priority value or a schedule for the reporting of the priority value.

Aspect 39. The method of one of aspects 36-38, wherein the priority value is reported using an explicit indication of the priority value or implied by resources used for reception of a message reporting the priority value.

Aspect 40. The method of one of aspects 26-39, further comprising: determining a priority value associated with the third wireless node; receiving, from the second wireless node, a message requesting a priority value of the third wireless node; and transmitting, to the second wireless node, an indication of the priority value associated with the third wireless node.

Aspect 41. The method of one of aspects 26-40, further comprising receiving, from the second wireless node, an indication of a priority value of the third wireless node.

Aspect 42. The method of aspect 41, transmitting a reporting configuration, wherein the reception of the indication of the priority value of the third wireless node is in accordance with the reporting configuration.

Aspect 43. The method of one of aspects 26-42, wherein the determination of the priority value associated with the second wireless node is based on at least one of: a mobility state of the second wireless node; a hop count associated with the second wireless node; a type of the second wireless node; network load of the second wireless node; a type of the network load; or a mode of operation of the second wireless node.

Aspect 44. A method for wireless communication, comprising: determining, at a first wireless node, a policy for handling interference between a second wireless node and a third wireless node, each of the second wireless node and the third wireless node being configured to serve one or more child nodes, and wherein the policy is based on a priority value associated with at least one of the second wireless node or the third wireless node; and transmitting an indication of the policy to at least one of the second wireless node or the third wireless node.

Aspect 45. The method of aspect 44, wherein the policy indicates, to the second wireless node, how to handle the interference if the priority values associated with the second wireless node and the third wireless node are equal or if the priority value associated with the third wireless node is unknown by the second wireless node.

Aspect 46. The method of aspect 45, wherein the policy indicating how to handle the interference comprises the policy indicating to determine whether to adjust a transmission configuration associated with communications of the second wireless node based on an identifier associated with the second wireless node and the third wireless node.

Aspect 47. The method of one of aspects 45-46, wherein the policy indicating how to handle the interference comprises the policy indicating to determine whether to adjust a transmission configuration associated with communications of the second wireless node based on a randomization algorithm.

Aspect 48. The method of one of aspects 44-47, wherein the policy indicates a threshold for determining an occurrence of the interference between the second wireless node and the third wireless node.

Aspect 49. The method of aspect 48, wherein the policy indicates, to the second wireless node, that the threshold is to be dependent on the priority value associated with the second wireless node.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 700 of FIG. 7, operations 800 of FIG. 8, and/or operations 900 of FIG. 9.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first wireless node, comprising:
    determining a priority value associated with the first wireless node configured to serve one or more child nodes;
    receiving a reporting configuration;
    reporting, in accordance with the reporting configuration, the priority value associated with the first wireless node to a second wireless node or a control node or broadcasting the priority value associated with the first wireless node;
    determining an occurrence of interference to communications of the first wireless node or the second wireless node;
    determining a priority value associated with the second wireless node; and
    taking one or more actions in response to the determination of the occurrence of interference based on the priority value associated with the first wireless node and the priority value associated with the second wireless node.

2. The method of claim 1, wherein determining the occurrence of the interference comprises receiving an indication of the interference.

3. The method of claim 1, wherein determining the priority value associated with at least one of the first wireless node or the second wireless node comprises receiving an indication of the priority value.

4. The method of claim 1, wherein the priority value associated with the first wireless node is specific to a beam to be used for the communications or a band associated with the communications.

5. The method of claim 1, wherein determining the occurrence of the interference comprises determining that the communications of the second wireless node are causing interference to the communications of the first wireless node, the method further comprising at least one of transmitting an indication of the interference or adjusting a transmission configuration associated with the communications of the first wireless node.

6. The method of claim 1, wherein, if the priority value associated with the first wireless node is equal to the priority value associated with the second wireless node, the one or more actions comprise:

adjusting a transmission configuration associated with the communications of the first wireless node; or transmitting an indication of the occurrence of the interference.

7. The method of claim 1, wherein determining the occurrence of the interference comprises determining that the communications of the first wireless node are causing interference to the communications of the second wireless node.

8. The method of claim 7, wherein the one or more actions comprise adjusting a transmission configuration associated with the communications of the first wireless node if the priority value associated with the first wireless node is less than the priority value associated with the second wireless node.

9. The method of claim 8, wherein adjusting the transmission configuration comprises adjusting:

a transmission power or power range associated with the communications of the first wireless node;

periodicity of transmissions associated with the communications of the first wireless node;

number of transmission occasions per period associated with the communications of the first wireless node;

frequency domain resources to be used for the communications of the first wireless node;

beam configuration to be used for the communications of the first wireless node; or any combination thereof.

10. The method of claim 7, wherein, if the priority value associated with the first wireless node is equal to the priority value associated with the second wireless node, the one or more actions further comprise determining whether to adjust a transmission configuration associated with the communications of the first wireless node based on a randomization algorithm.

11. The method of claim 7, wherein, if the priority value associated with the first wireless node is equal to the priority value associated with the second wireless node, the one or more actions further comprise determining whether to adjust a transmission configuration associated with the communications of the first wireless node based on identifiers associated with the first wireless node and the second wireless node.

12. The method of claim 1, wherein:

determining the priority value associated with the second wireless node comprises receiving an indication of the priority value associated with the second wireless node; and the method further comprises reporting the priority value associated with the second wireless node to a control node.

13. The method of claim 1, wherein the determination of the priority value associated with the first wireless node is based on at least one of:

a mobility state of the first wireless node;

a hop count associated with the first wireless node;

a type of the first wireless node;

network load of the first wireless node;

a type of the network load; or a mode of operation of the first wireless node.

14. The method of claim 1, wherein the one or more actions comprise:

adjusting a transmission configuration associated with the communications of the first wireless node; or transmitting an indication of the occurrence of the interference.

15. A method for wireless communication by a first wireless node, comprising:

determining a priority value associated with the first wireless node configured to serve one or more child nodes;

determining an occurrence of interference to communications of the first wireless node or a second wireless node;

determining a priority value associated with the second wireless node, wherein determining the priority value associated with the second wireless node comprises:

transmitting a message requesting the priority value associated with the second wireless node; and receiving an indication of the priority value associated with the second wireless node; and taking one or more actions in response to the determination of the occurrence of interference based on the priority value associated with the first wireless node and the priority value associated with the second wireless node.

16. A method for wireless communication by a first wireless node, comprising:

transmitting a reporting configuration to a second wireless node configured to serve one or more child nodes;

receiving a report, in accordance with the reporting configuration, of the priority value associated with the second wireless node from the second wireless node;

determining an occurrence of interference to communications of the second wireless node or a third wireless node;

determining a priority value associated with the third wireless node; and taking one or more actions in response to the determination of the occurrence of interference and based on the priority value associated with the second wireless node and the priority value associated with the third wireless node.

17. The method of claim 16, wherein the determination of the occurrence of the interference comprises receiving an indication of the occurrence of the interference.

18. The method of claim 16, further comprising transmitting at least one of an indication of the priority value associated with the second wireless node or an indication of the priority value associated with the third wireless node to at least one of the second wireless node or the third wireless node.

19. The method of claim 16, wherein the priority value associated with the second wireless node is specific to a beam to be used for the communications of the first wireless node or a band associated with the communications of the first wireless node.

20. The method of claim 16, wherein:

determining the occurrence of the interference comprises determining that the communications of the second wireless node are causing interference to the third wireless node; and the one or more actions comprise transmitting an indication, to the second wireless node, to adjust a transmission configuration associated with the communications of the second wireless node if the priority value associated with the second wireless node is less than the priority value associated with the third wireless node.

21. The method of claim 16, wherein the priority value associated with the second wireless node is based on at least one of:
- a mobility state of the second wireless node;
- a hop count associated with the second wireless node;
- a type of the second wireless node;
- network load of the second wireless node;
- a type of the network load; or
- a mode of operation of the second wireless node.

22. The method of claim 16, wherein the one or more actions comprise transmitting an indication, to the second wireless node, to adjust a transmission configuration associated with the communications of the second wireless node.

23. A method for wireless communication by a first wireless node, comprising:
- determining a priority value associated with a second wireless node configured to serve one or more child nodes;
- determining an occurrence of interference to communications of the second wireless node or a third wireless node;
- receiving, from the second wireless node, a message requesting the priority value associated with the third wireless node;
- determining a priority value associated with the third wireless node;
- transmitting, to the second wireless node, an indication of the priority value associated with the third wireless node; and
- taking one or more actions in response to the determination of the occurrence of interference and based on the priority value associated with the second wireless node and the priority value associated with the third wireless node.

24. An apparatus for wireless communications by a first wireless node, comprising:
- at least one processor; and
- memory coupled to the at least one processor, the memory comprising code executable by the at least one processor to cause the first wireless node to:
  - determine a priority value associated with the first wireless node configured to serve one or more child nodes;
  - receive a reporting configuration;
  - report, in accordance with the reporting configuration, the priority value associated with the first wireless node to a second wireless node or a control node or broadcasting the priority value associated with the first wireless node;
  - determine an occurrence of interference to communications of the first wireless node or the second wireless node;
  - determine a priority value associated with the second wireless node; and
  - take one or more actions in response to the determination of the occurrence of interference based on the priority value associated with the first wireless node and the priority value associated with the second wireless node.

25. An apparatus for wireless communications at a first wireless node, comprising:
- at least one processor; and
- memory coupled to the at least one processor, the memory comprising code executable by the at least one processor to cause the first wireless node to:
  - transmit a reporting configuration to a second wireless node configured to serve one or more child nodes;
  - receive a report, in accordance with the reporting configuration, of the priority value associated with the second wireless node from the second wireless node;
  - determine an occurrence of interference to communications of the second wireless node or a third wireless node;
  - determine a priority value associated with the third wireless node; and
  - take one or more actions in response to the determination of the occurrence of interference and based on the priority value associated with the second wireless node and the priority value associated with the third wireless node.

26. An apparatus for wireless communications by a first wireless node, comprising:
- at least one processor; and
- memory coupled to the at least one processor, the memory comprising code executable by the at least one processor to cause the first wireless node to:
  - determine a priority value associated with the first wireless node configured to serve one or more child nodes;
  - determine an occurrence of interference to communications of the first wireless node or a second wireless node;
  - transmit a message requesting a priority value associated with the second wireless node;
  - receive an indication of the priority value associated with the second wireless node; and
  - take one or more actions in response to the determination of the occurrence of interference based on the priority value associated with the first wireless node and the priority value associated with the second wireless node.

27. An apparatus for wireless communications by a first wireless node, comprising:
- at least one processor; and
- memory coupled to the at least one processor, the memory comprising code executable by the at least one processor to cause the first wireless node to:
  - determine a priority value associated with a second wireless node configured to serve one or more child nodes;
  - determine an occurrence of interference to communications of the second wireless node or a third wireless node;
  - receive, from the second wireless node, a message requesting the priority value associated with the third wireless node;
  - determine a priority value associated with the third wireless node;
  - transmit, to the second wireless node, an indication of the priority value associated with the third wireless node; and
  - take one or more actions in response to the determination of the occurrence of interference and based on the priority value associated with the second wireless node and the priority value associated with the third wireless node.

* * * * *